(12) United States Patent
Aggour et al.

(10) Patent No.: US 10,997,187 B2
(45) Date of Patent: May 4, 2021

(54) KNOWLEDGE-DRIVEN FEDERATED BIG DATA QUERY AND ANALYTICS PLATFORM

(71) Applicant: General Electric Company, Schenectady, NY (US)

(72) Inventors: Kareem Sherif Aggour, Niskayuna, NY (US); Paul Cuddihy, Ballston Lake, NY (US); Vijay Shiv Kumar, Niskayuna, NY (US); Jenny Marie Weisenberg Williams, Niskayuna, NY (US); Anthony Joseph Vinciquerra, Rexford, NY (US)

(73) Assignee: General Electric Company, Schenectady, NY (US)

( * ) Notice: Subject to any disclaimer, the term of this patent is extended or adjusted under 35 U.S.C. 154(b) by 68 days.

(21) Appl. No.: 16/282,643

(22) Filed: Feb. 22, 2019

(65) Prior Publication Data

US 2020/0272623 A1    Aug. 27, 2020

(51) Int. Cl.
*G06F 16/2458*     (2019.01)
*G06F 16/907*      (2019.01)
(Continued)

(52) U.S. Cl.
CPC ........ *G06F 16/2471* (2019.01); *G06F 16/256* (2019.01); *G06F 16/907* (2019.01);
(Continued)

(58) Field of Classification Search
None
See application file for complete search history.

(56) References Cited

U.S. PATENT DOCUMENTS 9,092,802 B1    7/2015 Akella
9,740,802 B2    8/2017 Nixon et al.
(Continued)

FOREIGN PATENT DOCUMENTS

CN    104035917 B    7/2017
WO    0201416 A2     1/2002

OTHER PUBLICATIONS

Bansal, Srividya K et al., "Towards a Semantic Extract-Transform-Load (ETL) Framework for Big Data Integration", IEEE International Congress on Big Data, Anchorage, 2014, DOI: 10.1109/BigData.Congress.2014.82, (pp. 522-529, 8 total pages).

(Continued)

*Primary Examiner* — Kim T Nguyen
(74) *Attorney, Agent, or Firm* — Dinsmore & Shohl LLP

(57) ABSTRACT

A system for querying a federated data store includes a metadata knowledge graph describing the contents and relationships among one or more underlying data stores, an interactive user interface receiving requests from a data consumer, a predefined constrainable query ('nodegroup') store containing predefined constrainable queries that define data subsets of interest across one or more of the underlying data repositories, a knowledge-driven querying layer generating and executing queries against the federated data store and merging responsive results, a scalable analytic execution layer receiving the search results from the federated data store and applying machine learning/artificial intelligence techniques to analyze the results, and a user interface presenting visualizations of raw or analyzed results to the consumer. A method and a non-transitory computer-readable medium are also disclosed.

7 Claims, 7 Drawing Sheets

(51) Int. Cl.
*G06F 16/9038* (2019.01)
*G06N 20/00* (2019.01)
*G06F 16/25* (2019.01)
*G06N 5/02* (2006.01)

(52) U.S. Cl.
CPC ........... *G06F 16/9038* (2019.01); *G06N 5/02* (2013.01); *G06N 20/00* (2019.01)

(56) References Cited

U.S. PATENT DOCUMENTS

| | | |
|---|---|---|
| 9,760,614 B2 | 9/2017 | Cuddihy et al. |
| 2014/0006338 A1 | 1/2014 | Watson et al. |
| 2015/0095303 A1 | 4/2015 | Sonmez et al. |
| 2016/0078128 A1 | 3/2016 | McHugh et al. |
| 2016/0224569 A1 | 8/2016 | Cuddihy et al. |
| 2018/0191867 A1 | 7/2018 | Siebel et al. |
| 2019/0005195 A1* | 1/2019 | Peterson ................ G06N 3/006 |
| 2019/0005200 A1* | 1/2019 | Zimmerman .......... G16H 10/60 |
| 2019/0026280 A1* | 1/2019 | Aviyam ................. G06N 20/00 |
| 2019/0034811 A1 | 1/2019 | Cuddithy et al. |
| 2020/0117737 A1* | 4/2020 | Gopalakrishnan ........................... G06F 16/2455 |
| 2020/0201910 A1* | 6/2020 | Gavaudan .......... G06Q 20/3823 |
| 2020/0272623 A1* | 8/2020 | Aggour .................. G06N 20/00 |
| 2020/0272624 A1* | 8/2020 | Aggour ................. G06F 16/248 |
| 2020/0272664 A1* | 8/2020 | Aggour ................. G06F 16/256 |

OTHER PUBLICATIONS

McHugh, Justin et al., "Integrated Access to Big Data Polystores through a Knowledge-driven Framework", IEEE International Conference on Big Data (Big Data), Boston, Dec. 11-14, 2017, (pp. 1494-1503, 10 total pages).

Cuddihy, Paul et al., "SemTK: A Semantics Toolkit for User-friendly SPARQL Generation and Semantic Data Management", 2018, 4pgs.

Williams, Jenny Weisenberg et al., "Semantics for Big Data Access & Integration: Improving Industrial Equipment Design through Increased Data Usability", IEEE International Conference on Big Data (Big Data), 2015, DOI: 10.1109/BigData.2015.7363864, (pp. 1103-1112, 10 total pages).

Cuddihy, Paul et al., "SemTK: An Ontology-first, Open Source Semantic Toolkit for Managing and Querying Knowledge Graphs", 2017, 11pgs.

European Search Report and Written Opinion dated Apr. 23, 2020 which was issued in connection with EP 20156553.8 which was filed on Feb. 11, 2020.

* cited by examiner

KNOWLEDGE-DRIVEN FEDERATED BIG DATA QUERY AND ANALYTICS PLATFORM

BACKGROUND

In many enterprises and/or organizations (e.g., commercial/industrial, academic, governmental, medical, etc.) multiple different kinds of data may be used and stored—for example, time series, property graphs, string tables, numeric data, images or other large files (which can be stored as binary large objects (BLOBs)), etc. Because these datasets vary widely in terms of format and content, there is minimal basis for querying across them in an integrated manner. Additionally, these data types can be in multiple data stores distributed locally and/or remotely. The conventional approach of a user manually generating multiple queries to interrogate disparate data types located across distributed sources is burdensome in time, network capacity, and infrastructure. This type of approach also requires that the user have knowledge of where the data is stored, how it is stored, and the specific query languages and mechanisms needed to access it. Conventional approaches do not provide a mechanism for describing the contents of these different datasets and how they relate to each other, thus there is no basis for an integrated query approach.

The challenge of analyzing and consuming a wide range of different data types and formats that are fundamentally linked is increasing in recent years as more volumes of data, and a larger diversity of types of data, are being generated and consumed in different industries. Data creation has been exploding for more than a decade, resulting in an explosion in data volume and variety.

Conventional approaches to solving the multimodal data integration problem shoehorn all different types of data into some common format within a single repository (e.g., extract/transform/load (ETL) operations into a large data warehouse), taking many different types of data, many of which are inherently non-relational, and forcing them into a relational structure. This approach is suboptimal with respect to both data storage and query performance.

Another more recent conventional approach requires the collection of different types of data forms into a single "no SQL" (NoSQL) data store. A NoSQL data store is attractive in that they make no assumptions about the format or structure of the data, however, this also leads to suboptimal performance with respect to both data storage and query performance. Software and systems accessing a NoSQL repository must have a priori knowledge of how the data is structured to meaningfully interact with the data, applying that structure every time any data is retrieved from the NoSQL store. Thus, this conventional approach is also suboptimal. First, the data needs to be relocated into a single NoSQL data store; and second, a NoSQL data store ignores the structural attributes of the different data formats that are traditionally used to minimize the data storage footprint and maximize read performance, write performance, or both. NoSQL stores are unable to benefit from any such optimizations.

Another conventional approach to integrate multimodal datasets involves building complex middleware that queries across diverse datastores using a common query language. However, this middleware approach is premised on the user knowing the storage locations of each type of data and invoking the appropriate middleware components as needed.

What is missing from the art is a system that provides a flexible, logical view of multiple disparate datastores in a manner that eliminates the need for a user to have knowledge of the underlying data types, locations and storage mechanisms, and that also provides a way to describe the different data and the relationships between them.

DESCRIPTION

Figure 1:
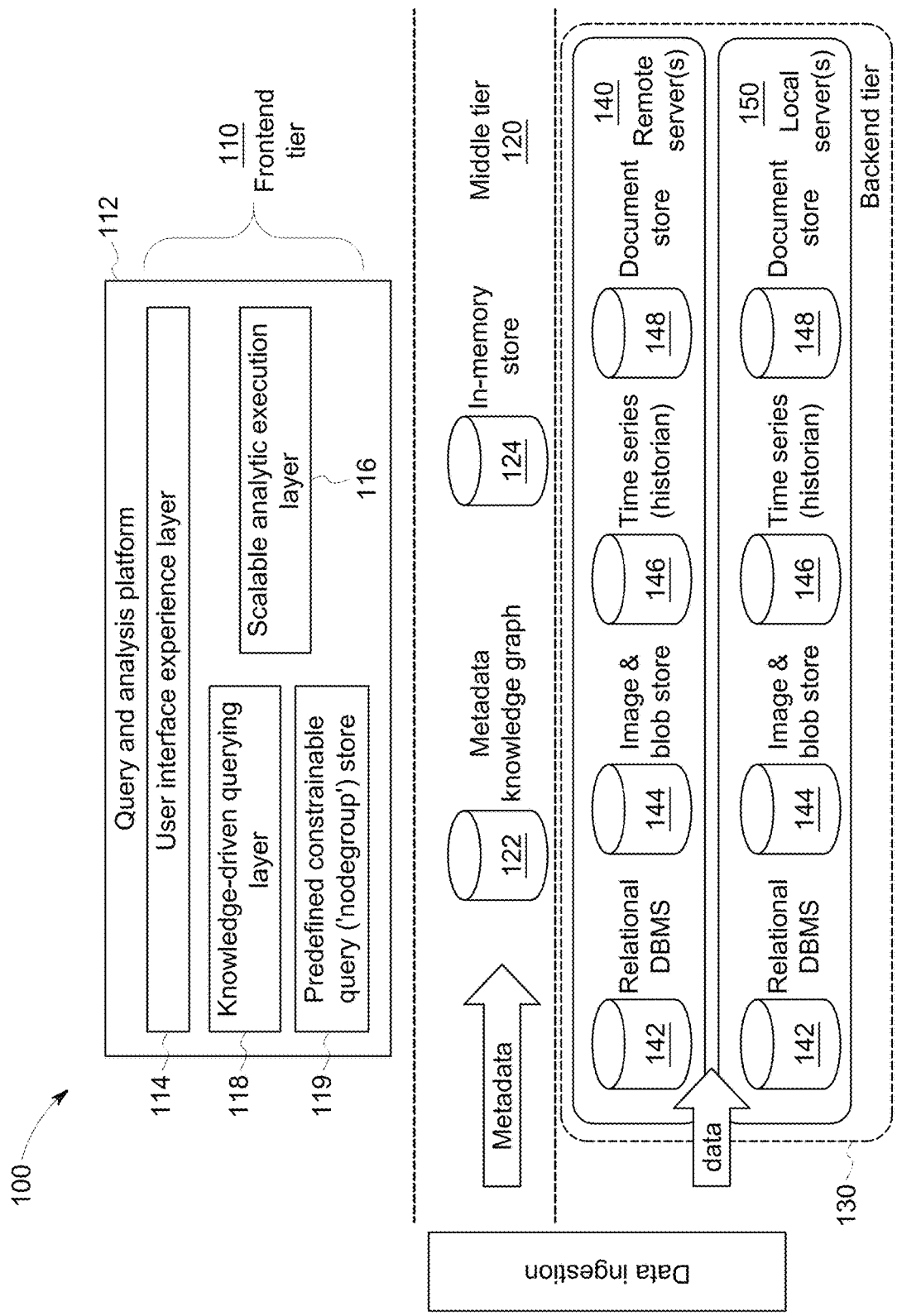
FIG. 1 illustrates a three-tier system in accordance with embodiments.

Embodying systems and methods provide a mechanism for users to interact with diverse, heterogeneous data as though it were all stored within the same physical system. Further, a user can run analytics on that data without having to define an external environment to host those analytics. Embodying systems and methods remove from the user the burden of knowing where the data is stored, how it is stored, or what specific query languages and mechanisms are needed to access different data types.

In accordance with embodiments, a user is presented with a single, logical interface through which they can interact with the data and run analytics, without needing knowledge or information regarding the infrastructure being queried. Embodiments solve a significant challenge for data scientists and others who require access to diverse types of data to do their jobs. Development of multimodal data-driven applications is simplified. Developers can use application programming interfaces (APIs) available with an embodying interface to build applications with a single logical view to potentially many diverse, federated data stores. These applications can be built to pull data from and/or push data to the federated data stores. Software developers also benefit as they do not have to be aware of the underlying data storage layers, query languages and query mechanisms required to query and retrieve data from each of the various data repositories when building multimodal data-driven applications. This logical interface can also be used to push data out (for storage) to one or more disparate repositories.

Contrary to conventional approaches, embodying systems and methods do not require the movement of data into a single repository prior to searching. Rather, an embodying interface is a layer through which the user interacts to generate queries to, and receive results from, multiple data stores having a multiplicity of data format types. By not moving data to a single search location, embodying systems and methods avoid excess traffic volume on the network, and reduces the burden on the network infrastructure, thus improving network overall performance—all of which results in improvement over prior systems and approaches. Both technically and commercially, embodiments enable significant savings in time and effort for both data consumers and application developers, by abstracting away the necessary details of selecting and targeting disparate data stores and data types.

Embodying systems include a knowledge-driven query and analysis platform for federated Big Data storage. This query and analysis platform links diverse types of data, located in diverse data stores (i.e., data warehouses, relational or columnar databases, knowledge graphs, time series historians, file stores, etc.) together such that a data consumer does not have to be aware of where the data is physically located; nor be aware of the disparate data formats.

This linkage by embodying systems is achieved without the conventional need to move data to a single location prior to executing a query of the data. Embodying systems and methods respond to queries submitted to the query and analysis platform by searching across one or more elements of the federated Big Data storage environment, as needed. In accordance with embodiments, the query and analysis platform enables the capture and back-end storage of a plethora of diverse data types in datatype-appropriate storage media—each data type can be stored in a repository optimized for the efficient storage and retrieval of large volumes of that type of data (e.g., relational data is captured in a Big Data relational database, time series in a Big Data historian, images in a Big Data file store, etc.).

An embodying query and analysis platform interface enables the execution of queries and analytics directly within the data storage infrastructure to minimize data movement and accelerate analytic runtime. An ontology, a semantic domain model, and/or a linked knowledge graph data model can be implemented to model these stored datasets and data stores, as well as to capture the relationships between the datasets. For discussion purposes, within this document the terms "knowledge graph", "ontology", and "semantic model" are used interchangeably as the modeling mechanism by which the query and analysis platform describes the stored datasets and the relationships between disparate datasets. It should be readily understood that embodying systems and methods are not limited to any specific mechanism but can be implemented by these and any other mechanism that can be used to generate the model.

In accordance with embodiments, query submission to the query and analysis platform can be generated by many types of data consumers and/or users. The terms "consumer" and "user" as used herein can refer to a simulation, an analytic operation, linked data, individual persons of various roles (e.g., modelers, developers, business people, academics, medical and legal professionals, etc.).

A knowledge graph captures metadata on the data storage systems used to house the data, including models of the data stored in each repository, the structure of that data in each repository, and models of how to access those repositories to retrieve the different types of data. Application program interfaces (APIs) built on top of the knowledge graph data and metadata enables any of the user types alike to interact seamlessly with the disparate data via a single interface, without the user needing to be aware of the varying physical data storage locations or their respective query mechanisms/ requirements.

Implementing embodying systems and methods can federate pre-existing Big Data systems. Systems and methods disclosed herein can utilize existing data stores including, for example (but not limited to), scalable semantic triple stores, scalable relational databases, scalable time series data stores, scalable image and file stores, and so on. Implementing the embodying query and analysis platform avoids the problems associated with the conventional approach of shoehorning multiple data format types into data stores that may be efficient for one type of data but inefficient for another.

In accordance with embodiments, data is retrieved across the disparate data stores by queries automatically generated by the query layer when a user (person or analytic) requests data from one or more of the underlying repositories. To link data residing across these federated data stores, an ontology (semantic domain model) can be instantiated in a semantic triple store (e.g., a knowledge graph database) to model the underlying data, and relationships, of the federated data stores. This semantic domain model can capture metadata about the specific repositories including their respective requirements to access each type of data. In response to user queries, the query and analysis platform can use this metadata to programmatically construct repository-specific queries and merge the retrieved data without manual intervention.

An embodying system has three tiers. A back-end tier includes the diverse data stored across a federation of data repositories. This back-end tier can have multiple repositories, each optimized for underlying storage efficiency, access performance, and analytic execution. A middle tier includes a semantic toolkit to provide semantic drag-and-drop query generation and data ingestion (e.g., the Semantics Toolkit (SemTK), GE Research, Niskayuna N.Y.). The semantic toolkit provides interfaces with semantic technology stacks by utilizing a knowledge graph model of the data storage systems used to house the data. The knowledge graph layer resides above the Big Data stores and operates as the mechanism through which users and analytics interact with the various stores. Semantic Toolkit APIs can be used to call and interact with the data whether it is stored in the knowledge graph or in one of the other repositories.

The front-end tier provides the user interface experience (UEX) design. Users are presented with a single logical view of the data stored in the system, as represented through the knowledge graph. The UEX allows users to interactively explore the data as though it were captured in a single repository, giving the veneer of a single logical data storage system. The platform further allows users to use the knowledge graph to specify data as input to analytics that run within the platform itself, such that the analytics can efficiently pull the data from across the federated repositories to optimize the analytic runtime.

FIG. 1 illustrates a three-tier system 100 in accordance with embodiments. Frontend tier 110 includes the query and analysis platform 112 containing user interface experience (UEX) 114, scalable analytic execution layer 116, knowledge-driven query layer 118, and predefined constrainable query (referred to as a 'nodegroup') store 119. The query and analysis platform provides a user with a veneer of a single, common interface from which the user can specify analytic data requirements independent of the repository type and location, data format, and query language. A query of underlying data can be generated from a user request. From this layer, a user can access (e.g., view, transfer, and/or download) the content of a knowledge graph responsive to specified analytic requirements that exposes data of differing types from different data repositories.

UEX 114 provides a dynamic, interactive user interface for a user to access the system. In some implementations, the UEX can include data governance to limit data access based on a user's function within the organization and/or their clearance level.

The UEX can present different visualizations of query results. FIGS. 2A-2D illustrate exemplary representations in accordance with embodiments. For purposes of illustration, FIGS. 2A-2D illustrate query results pertaining to additive manufacturing processes. However, the visualizations are not so limited. It should be readily understood that data visualization is dependent on the subject matter of each domain and the type of data.

Figure 2A:
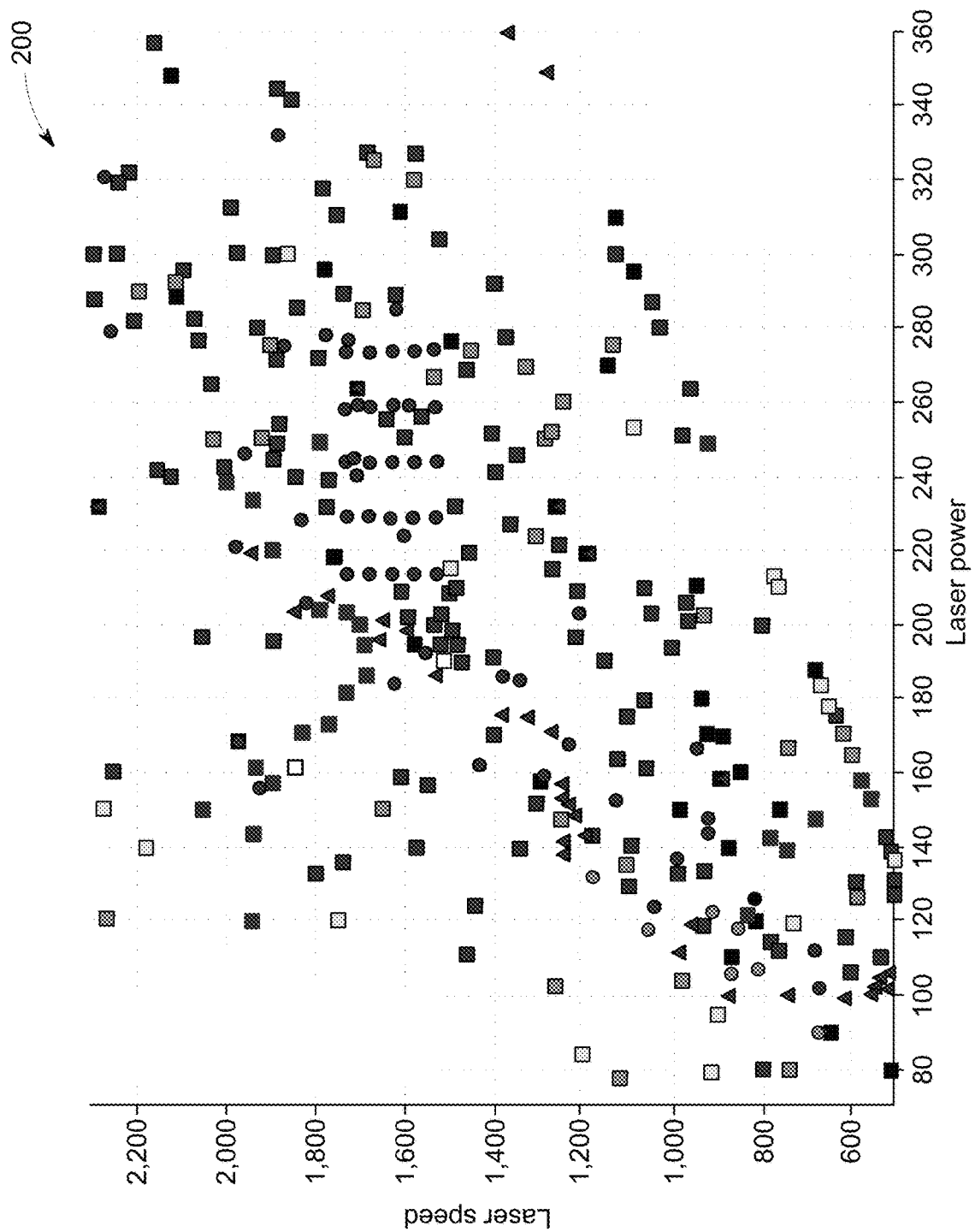
FIGS. 2A-2D illustrate exemplary data presentations in accordance with embodiments.
Figure 2B:
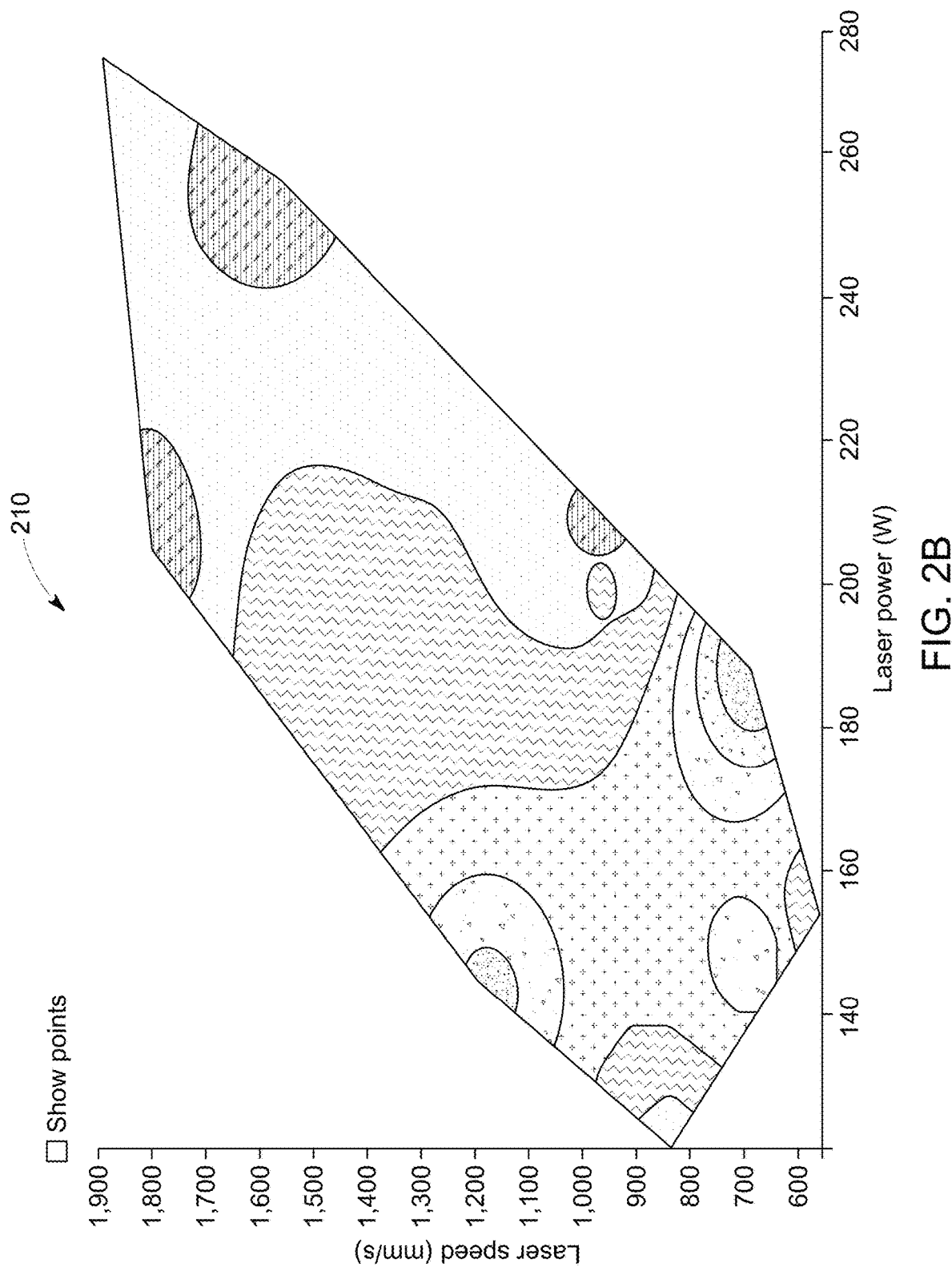
Figure 2C:
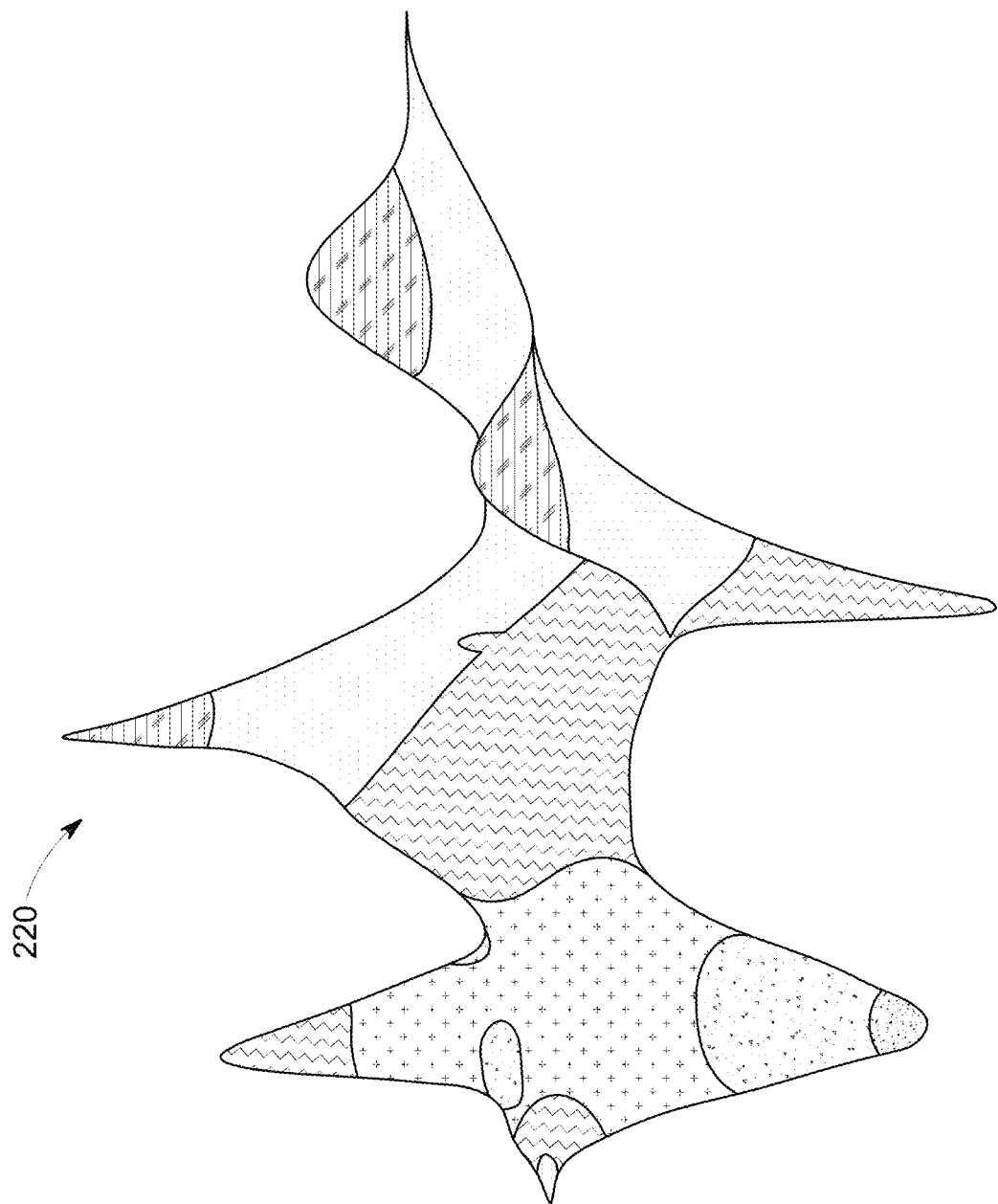
Figure 2D:
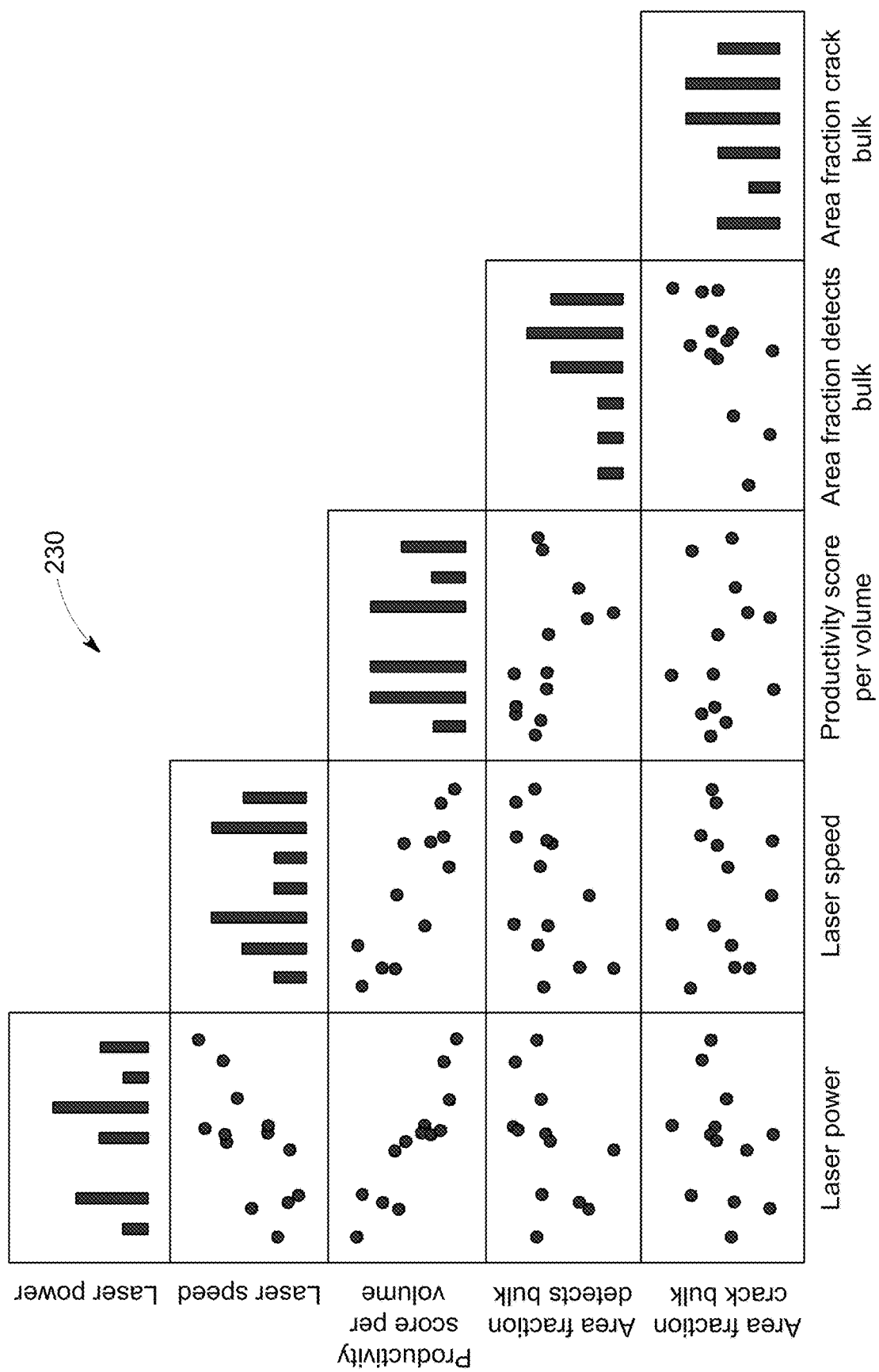

FIG. 2A represents a scatter plot 200; FIG. 2B represents a contour plot 210; FIG. 2C represents a three-dimensional plot 220; FIG. 2D represents a matrix table plot 230. Other visualizations can include time-series plots, images, tabular, etc. In accordance with embodiments, UEX 114 presents interactive visualizations. For example, a user can discern an outlier data point in the visualization; select that data point using a pointing device; and have the underlying data presented for viewing. The underlying data can be presented in the native data format that provided that data point—image, relational data table, document, etc. In accordance with embodiments, a user does need to know the data store source, location, or data type to have the underlying data pulled for presentation.

Scalable analytic execution layer 116 executes a variety of analytics, including, but not limited to, data mining, statistical analysis, image processing, machine learning and artificial intelligence analytics, at scale. Conventional approaches require funneling data from remote locations to a single server and processing a query at that single server. In accordance with embodiments, scalable analytic execution layer 116 can define a query and pass it to the background layer 130 for distributed, parallel execution at the remote data store servers.

Knowledge-driven query layer 118 includes a domain-specific semantic model of the particular use case to which system 100 is being applied. In accordance with implementations, a user's perspective of system 100 is through UEX 114, thus the user only is presented with one interface model for any of these use cases.

The knowledge-driven query layer is in communication with nodegroup store 119 containing a library of use case-driven, domain-specific nodegroups that may extract data from the federated data stores. The use of nodegroups achieves the goal of separating the analysis platform UEX (and users, analytics, simulations, etc.) from the federated data stores. Each nodegroup can describe linked data sub-graphs-of-interest. One or more nodegroups can be used to generate queries of entire data sets, generate legal (i.e., filtered) values for each "column" of the data set, count data, or ingest data. The nodegroup store can include domain-specific nodegroups, which can be retrieved to perform straightforward data retrieval operations on one or more federated data stores. Each nodegroup is a predefined, constrainable query prepared specifically to retrieve and possibly join together a specific subset of data.

A nodegroup represents a subgraph of interest needed to fulfill a user query. This subgraph representation contains a set of classes, a list of properties that are returnable or constrainable for each class, and properties which link the class to other classes in the nodegroup. The nodegroup may contain other information as well. A particular nodegroup can be selected from the knowledge-driven query layer 118 based on the user query.

The knowledge-driven query layer can include services and libraries for processing the nodegroup to determine the division between semantic and non-semantic data. In accordance with embodiments, semantic models are used to model diverse data stores, and enable the linking of data based on the user's request.

Each nodegroup is a pre-defined template used to assemble a query based on the user's request entered in UEX 114. Each nodegroup may span different parts of a domain-specific ontology. Conventionally, these different data stores would not be available from a single federated query.

From the information contained in a nodegroup (e.g., classes, attributes, class links, etc.), several types of queries can be generated. These queries can include retrieving distinct entries, which are constructed by walking the entire nodegroup and building connections and constraints. Constraint clauses can be further dynamically added to a larger query. For any nodegroup query, any element can be removed from the return list such that the remaining query could be narrowed so that it returns values of a single variable. This would result in a query that retrieves all existing values of a specific variable. In practical terms, this generates a list of legal filter values for any item in the query based upon existing data, which could be used to filter results in a larger query. In addition to 'select' queries that return data, the nodegroup can also be used to generate 'insert' queries to add data to constituent data stores of the federated stores. The nodegroup can also be used to generate 'count', 'construct', and 'delete' queries.

The nodegroup can also be used as an exchangeable artifact, allowing a subgraph of interest to be captured, stored for future use, or passed between environments. With the help of ontology information, the nodegroup data structure can be much more effectively validated, modified, and displayed than could a raw query.

When building a nodegroup, pathfinding functionality is used to find connections between different classes in the ontology. The class to be added is considered the path endpoint, and all the classes in the existing nodegroup as potential start points. Any intervening classes are suggested as part of the potential paths between the existing nodegroup and the class to add to the query. A specific embodiment of pathfinding is implemented with the A* algorithm, with a few modifications for performance.

Pathfinding assists in query-building, and also can be used in determining if, and what, external services need to be called to retrieve data. Pathfinding techniques can be applied to identify these external services, by identifying classes that model external datasets as required to complete a query connecting multiple entities in the knowledge graph. These external services can require additional information (e.g., calling parameters) specific to particular data stores and data types within a particular store. Pathfinding allows this information to be located and added to the query on demand, without human intervention.

Middle tier 120 may include an in-memory data store 124, which can be used as a memory cache for small subsets of data. Metadata knowledge graph 122 captures metadata regarding links and relationships of the data across the federated data stores. For example, the metadata knowledge graph can contain information about the federated data stores (e.g., location, data structure(s), query language(s), etc.). The metadata knowledge graph also includes information about their contents—the data available from each store of the federated data store (e.g., location, type/format, file size, etc.). The metadata knowledge graph can access this information by using APIs compatible with individual data store constituents of the federated stores.

Back-end tier 130 is the physical data store hardware and management systems on which the data is deployed. Each physical data store can be a scalable repository optimized for each data type that it contains. The back-end tier can include remote server(s) 140 and local server(s) 150. Local and remote servers can include a portion of, or all of, relational DBMS store(s) 142, image and BLOB store(s) 144, time series data store(s) 146, and document storage store(s) 148, and more. The location of a particular data store needed to fulfill a user's query is transparent to the user interfacing with system 100 through query and analysis platform 112.

The federated data store is a global data store that captures information—for example, in additive manufacturing data can be captured across all factories, printers, parts, materials, etc., to capture global knowledge across a manufacturer. Frequent synchronization allows data and knowledge to be shared between edge devices and federated stores, so that edge devices have the information they need to operate while central storage retains a complete record of the most relevant information for machine learning and analytics to drive optimizations over time. This data architecture efficiently and scalably stores data and data relationships, to enable access and rapid analytics across data types across the additive manufacturing lifecycle.

Middle tier 120 and back-end tier 130 ingest data provided by use case-specific elements. For example, an additive manufacturing system can have various data sources across the additive machine production lifecycle, including: materials properties, part designs, design simulations, build and post-process parameters, parts and product inspection results, etc. Middle tier 120 and back-end tier 130 ingest data provided by use case-specific elements. Detailed data is stored in the back-end tier federated stores, and the middle tier absorbs metadata that is used as described above to select nodegroup(s) to generate the user's query.

Embodying systems and methods provide a user (i.e., data consumer) the ability run an analytic on a large volume of data captured in the federated data store without needing to extract that distributed data from one or more data stores prior to running the analytic. Conventional approaches to executing analytics is to extract data from one or more data stores all at once and push the extracted data to a single machine for processing. However, advances in data storage capacity and breadth renders this conventional approach untenable for Big Data—the amount of extracted data may be too large to load onto a single server and may take too long to transfer over the network from tens or hundreds of machines to a single machine.

In accordance with embodiments, a query is automatically analyzed to identify if it will require the extraction of too much data for moving and processing on a single server. If such a condition is found, embodiments break the query into many smaller subqueries and pass the smaller subqueries to distributed servers holding portions of the Big Data. Each of these distributed machines will then run the subquery on their local data in parallel with the other subqueries. For example, if the conventional approach of a single overarching query would result in a response of ten million records to be extracted and queried at a single machine, embodiments could generate 1,000 query tasks to run in parallel at distributed locations in the federated data store. These 1,000 query tasks could then each process 10,000 distinct records locally, thus avoiding the need to extract the full 10 million records to a single location.

The results generated from the local processing of the query tasks can then be passed to the scalable analytic execution layer for aggregation of the results. The scalable analytic execution layer can perform operations on the aggregated results (depending on the specific analytic requirements). Thus, embodiments avoid the creation of data movement and data processing bottlenecks while still delivering knowledge-driven query and analysis capabilities across federated Big Data. Embodying approaches to data abstraction are bidirectional—i.e., the user does not need to know details of where or how the data is stored; and similarly the scalable analytics also do not need to know details of where or how the data is stored.

Embodying systems and methods leverage conventional massive data distribution and parallel processing techniques (e.g., Apache Hadoop® and Apache Spark® (Apache Software Foundation, Wakefield, Mass.)) without having to embed knowledge of the federated data stores directly into the Hadoop or Spark code—e.g., in accordance with embodiments the Hadoop or Spark analytics are fed queries they can execute to extract data from one or more of the repositories without knowing precisely where the data comes from.

Figure 3:
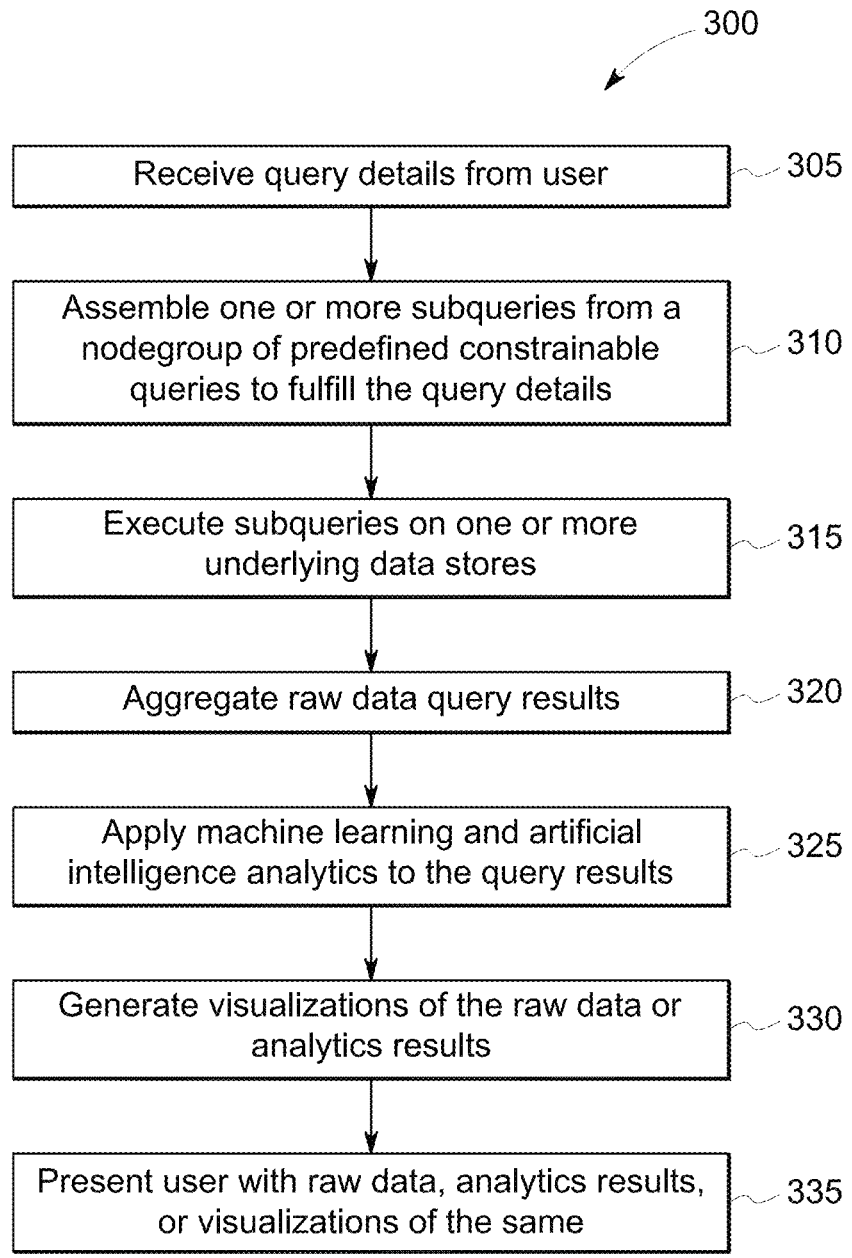
FIG. 3 illustrates a process of querying federated data stores in accordance with embodiments.

FIG. 3 illustrates process 300 to query federated data stores in accordance with embodiments. Query and analysis platform 112 receives query details, step 305, provided by a data consumer to UEX 114. One or more subqueries are assembled from a nodegroup of predefined constrainable queries to fulfill the user provided query details, step 310. Metadata knowledge graph 122 can apply a domain-specific semantic model to the query details to identify the subqueries based on metadata of the federated stores. These subqueries can perform a particular query at specific data stores in the federated stores.

The subqueries are executed, step 315, at one or more of the underlying data stores within the federated data store. Raw data results of the subqueries are aggregated, step 320. In accordance with implementations, scalable analytic execution layer 116 can optionally apply machine learning and artificial intelligence techniques to the query results, step 325. These techniques identify data correlations responsive to the consumer's query details. Visualizations of the raw data or analytic results can be generated, step 330. The visualizations of raw data and/or analytic results, or the raw data and/or analytic results in native format (e.g., relational data, time series data, images, document, etc.) can be presented to the data consumer, step 335.

Figure 4:
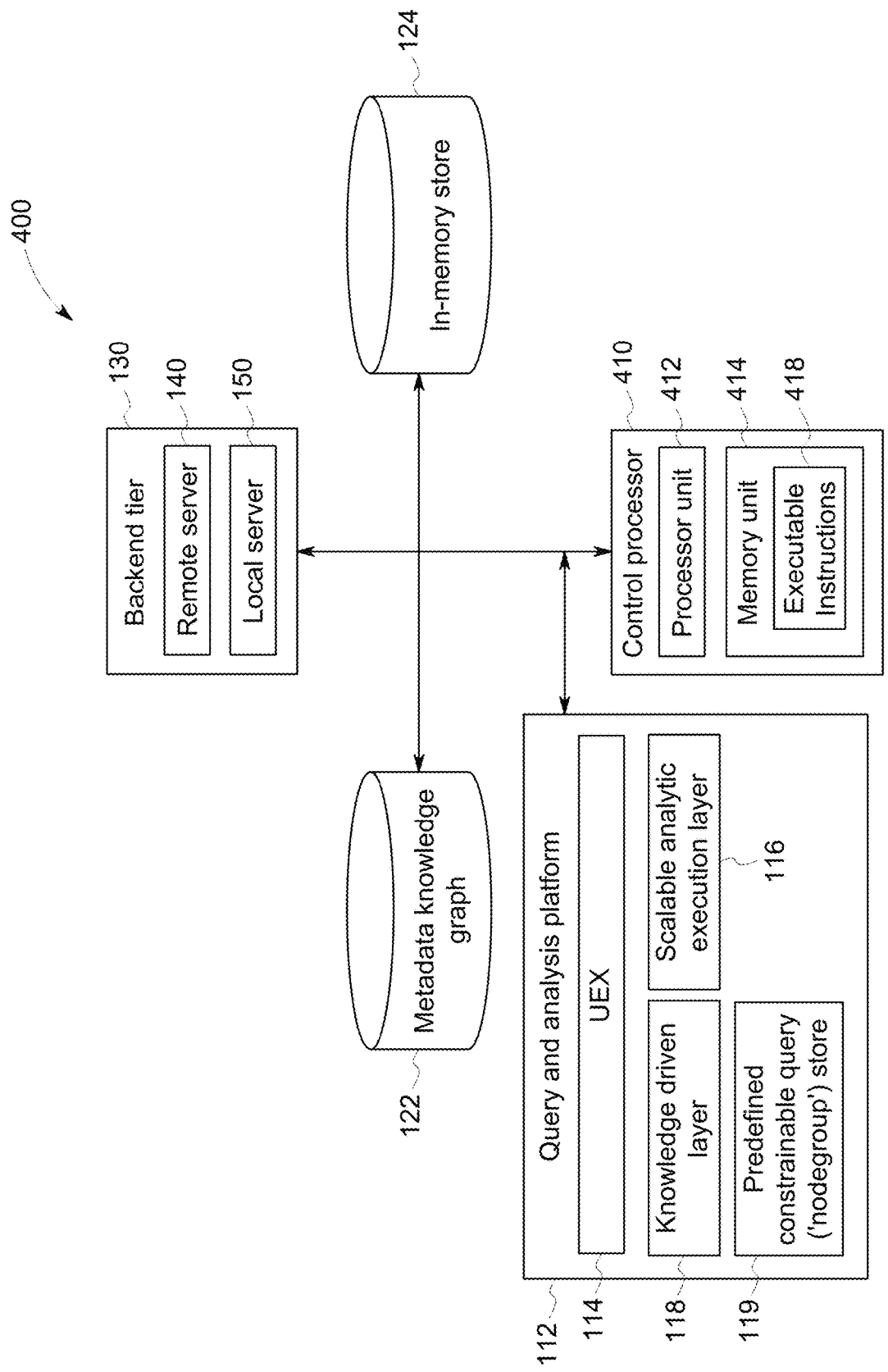
FIG. 4 illustrates a system for implementing the three-tier system of FIG. 1 in accordance with embodiments.

FIG. 4 illustrates system 400 for implementing three-tier system 100 in accordance with embodiments. Control processor 410 can include processor unit 412 and memory unit 414. The memory unit can store executable instructions 418. The control processor can be in communication with elements of system 100 across local control/data networks and/or electronic communication networks, as needed. Processor unit 412 can execute executable instructions 418, which cause the processor to perform the querying of federated data stores in accordance with embodiments as disclosed above. Memory unit 414 can provide the control processor with local cache memory.

In accordance with some embodiments, a computer program application stored in non-volatile memory or computer-readable medium (e.g., register memory, processor cache, RAM, ROM, hard drive, flash memory, CD ROM, magnetic media, etc.) may include code or executable program instructions that when executed may instruct and/or cause a controller or processor to perform methods discussed herein such as a method of connecting to multiple, distributed data stores containing various data types to obtain a result to a user's query submitted through a single user interface by generating subqueries of the distributed analytics, as disclosed above.

The computer-readable medium may be a non-transitory computer-readable media including all forms and types of memory and all computer-readable media except for a transitory, propagating signal. In one implementation, the non-volatile memory or computer-readable medium may be external memory.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

The invention claimed is:

1. A system for generating and running federated queries against a plurality of data stores storing disparate data types, the system comprising:
   a memory unit containing executable instructions;
   a processor unit in communication with the memory unit;
   the processor unit configured to access the executable instructions, the executable instructions causing the processor unit to implement:
   a query and analysis platform including an interactive user interface experience layer, a knowledge-driven querying layer, a scalable analytic execution layer, and a predefined constrainable query store containing one or more predefined constrainable queries;
   a metadata knowledge graph store including a metadata knowledge graph, the metadata knowledge graph containing metadata for links and relationships of data in one or more of the plurality of data stores and metadata on how to programmatically query one or more of the plurality of data stores;
   the user interface experience layer presenting an interactive user interface to receive query details from a data consumer;
   the knowledge-driven querying layer configured to access the metadata knowledge graph and select one or more of the predefined constrainable queries from the predefined constrainable query store, the selected one or more predefined constrainable queries providing a query template to search at least one of the plurality of data stores;
   the knowledge-driven querying layer configured to use the selected one or more predefined constrainable queries to generate queries against the federated data stores for execution of a search responsive to the received query details, the search being conducted at the one or more federated data stores;
   the knowledge-driven querying layer configured to merge responsive data from the federated data stores into a single data set to be presented to the user;
   the scalable analytic execution layer configured to receive the search results merged from the federated data stores and to apply machine learning and artificial intelligence techniques to the search results, the machine learning and artificial intelligence techniques to analyze the query results; and
   the user interface experience layer configured to present visualizations of the analytic results to the data consumer.

2. The system of claim 1, including:
   the query and analysis platform configured to receive a data consumer request to view one or more underlying data points of the data analysis;
   the query and analysis platform configured to receive the one or more underlying data points after retrieval from the federated data store, the retrieved one or more underlying data points being in native format; and
   the query and analysis platform configured to present a visualization of the retrieved one or more data points to the data consumer.

3. The system of claim 1, including each predefined constrainable query template designed to query one or more of the underlying federated data stores.

4. The system of claim 1, including the metadata knowledge graph configured to ingest metadata from use case-specific elements of a domain.

5. The system of claim 1, including at least two of the plurality of data stores:
   configured as disparate data store types;
   containing disparate data formats;
   requiring disparate query languages; and
   storing data in disparate structures.

6. The system of claim 1, including the user interface experience layer configured to provide a veneer of a single logical data system to the data consumer, the veneer providing the data consumer interactive exploration of the disparate data types across the plurality of data stores, the interactive exploration not requiring consumer input of a format or a location of the disparate data types in the federated data store.

7. The system of claim 1, including the scalable analytic execution layer configured to define a query and pass the defined query to the federated data store for distributed parallel execution at one or more of the plurality of data stores.

* * * * *